United States Patent
Moore et al.

[15] 3,679,695
[45] July 25, 1972

[54] CERTAIN THIAZOLYLHALOAL-KAVESULFORANILIDES

[72] Inventors: George G. I. Moore, Birchwood; John F. Gerster, Woodbury, both of Minn.

[73] Assignee: Minnesota Mining and Manufacturing Company, St. Paul, Minn.

[22] Filed: Dec. 14, 1970

[21] Appl. No.: 98,010

[52] U.S. Cl............................260/302 S, 260/299, 260/302 R, 424/245, 424/270
[51] Int. Cl. ...........................................................C07d 91/00
[58] Field of Search ........................................260/302, 302 S

[56] References Cited

UNITED STATES PATENTS 2,858,318  10/1958  Stoll et al.................................260/302
2,994,701  8/1961   Sprague et al. ........................260/302

Primary Examiner—Alex Mazel
Assistant Examiner—R. J. Gallagher
Attorney—Kinney, Alexander, Sell, Steldt & Delahunt

[57] ABSTRACT

Thiazole derivatives in which a thiazole ring is linked by carbonyl, sulfonyl, sulfinyl, oxygen and sulfur to a phenyl ring which is substituted by a haloalkylsulfonamido group in which the sulfonamido nitrogen atom is optionally substituted. These compounds are active anti-inflammatory agents.

18 Claims, No Drawings

CERTAIN THIAZOLYLHALOALKAVESULFORANILIDES

This invention relates to thiazole derivatives in which a thiazole ring is linked by carbonyl, sulfonyl, sulfinyl, oxygen or sulfur to a phenyl ring which is substituted by a haloalkylsulfonamido group in which the sulfonamido nitrogen atom is optionally substituted. For convenience, they may also be referred to as substituted thiazoles. These compounds are active anti-inflammatory agents and some are also analgesic, antipyretic, antimicrobial and/or plant growth modifying agents.

It is an object of the invention to provide compounds which are anti-inflammatory agents.

It is an object of the invention to provide compounds which are analgesic agents.

It is an object of the invention to provide compounds which are antipyretic agents.

It is an object of the invention to provide compounds which are antimicrobial agents.

It is an object of the invention to provide compounds which modify the growth of plants, i.e. which prevent, alter, destroy or otherwise affect the growth of plants.

It is a further object of the invention to provide a method for controlling inflammation in mammalian tissue.

It is a further object of the invention to provide a method for controlling unwanted plants.

It is a further object of the invention to provide a method for relieving pain.

It is a further object of the invention to provide a method for reducing fever in mammals.

It is a further object of the invention to provide a method for controlling microorganisms.

It is still another object of the invention to provide anti-inflammatory compositions containing one or more substituted thiazoles as active ingredients therein.

It is still another object of the invention to provide antimicrobial compositions containing one or more substituted thiazoles as active ingredients therein.

It is still another object of the invention to provide plant growth modifying compositions containing one or more substituted thiazoles as active ingredients therein.

It is still another object of the invention to provide analgesic compositions containing one or more substituted thiazoles as active ingredients therein.

It is still another object of the invention to provide antipyretic compositions containing one or more substituted thiazoles as active ingredients therein.

Still other objects will be made apparent by the following specification.

DETAILED DESCRIPTION

According to the present invention, there is provided a class of compounds of the formula:

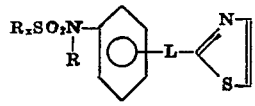

I wherein $R_x$ is haloalkyl of one to four carbon atoms containing at least one halogen atom bonded to the alpha carbon atom or at least two halogens are bonded to the beta carbon atom, (i.e. the carbon atoms alpha and beta to the sulfonyl group in the formula), R is hydrogen, lower alkyl (preferably containing from one to four carbon atoms), a pharmaceutically acceptable cation or a member of the group represented by the formula:

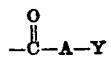

wherein A is oxygen or a carbon-carbon bond and Y is lower alkyl (preferably containing from one to four carbon atoms) and L is —O—, —S—, carbonyl, sulfinyl or sulfonyl.

No compounds closely similar to those of the present invention are known. 2-amino-4-(4-trifluoromethylsulfonamidophenyl) thiazole has been disclosed, but this compound has the rings linked by a direct ring-carbon to ring-carbon bond, does not contain a linking group and contains a functional amino group on the thiazole ring.

$R_x$ can be a straight or branched chain perhaloalkyl or partially halogenated alkyl. The haloalkyl groups may contain bromine or iodine, but preferably contain only fluorine and/or chlorine. As noted previously, $R_x$ should have at least one halogen bonded to the alpha carbon atom, or if there is no halogen bonded to the alpha carbon atom at least two halogens bonded to the beta carbon atom. The haloalkyl radicals may contain only one type of halogen, or the halogens may be mixed. When the halogen atoms in $R_x$ contain fluorine and chlorine, it is preferable to have one or more fluorine atoms per chlorine atom. Compounds wherein $R_x$ contains one or two carbon atoms are presently preferred. Most preferred are compounds wherein $R_x$ is trifluoromethyl or difluoromethyl since these are generally most active as anti-inflammatory agents.

The compounds of the invention are acidic in nature when R is hydrogen. Consequently, they form salts i.e. compounds of Formula I wherein R is a pharmaceutically acceptable cation. These are generally alkali metal (e.g. barium, calcium and magnesium), other metal (e.g. aluminum, zinc and iron), ammonium and amine salts. The compounds of the invention wherein R is hydrogen or a pharmaceutically acceptable cation are presently preferred. Those compounds in which R is an amine cation form a particularly preferred group. The amine salts include the salts of aliphatic (e.g. alkyl), aromatic and heterocyclic amines, as well as those having a mixture of these types of structures. The amines useful in preparing the salts of the invention can be primary, secondary or tertiary and preferably contain not more than 20 carbon atoms.

The salts of the invention can be prepared by treating the acid form (wherein R is hydrogen) with a stoichiometrically equivalent amount of an appropriate base under mild conditions. Since many of the salts are water soluble, they are often used in the form of aqueous solutions. Also, they can be used in making pharmaceutical preparations in the form of capsules for oral administration.

Compounds of the invention wherein R is hydrogen or a pharmaceutically acceptable cation are generally active as anti-inflammatory agents. The compounds in which R is a pharmaceutically acceptable cation sometimes provide advantages such as improved absorption, desirable solubility and stability characteristics. Compounds wherein R is alkyl, or the group

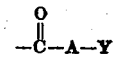

as defined above are generally less active than the corresponding compounds wherein R is hydrogen or a pharmaceutically acceptable cation, but are often less toxic to mammalian species. When R is lower alkyl, the alkyl group is preferably methyl.

It appears that the active species is the compound wherein R is hydrogen, and that other R groups are converted to give the active species in vivo although the invention is in no way limited by this theory. If a compound wherein R is other than hydrogen has a better therapeutic ratio ($LD_{50}/ED_{35}$) than the analagous compound wherein R is hydrogen, this compound may be preferred for therapeutic treatment.

In Formula I, L is preferably oxygen, sulfur or carbonyl. Most preferably it is sulfur.

Generally to produce the compounds of Formula I wherein R is a hydrogen atom, an aniline derivative of Formula II is condensed with a haloalkanesulfonyl halide or anhydride according to the following scheme:

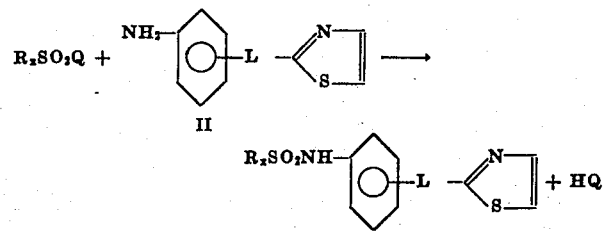

wherein $R_x$ and L are as previously defined and Q represents a halogen atom, preferably chlorine or fluorine, or the corresponding anhydride grouping —$OSO_2R_x$. Approximately equivalent amounts of the reactants are brought together at temperatures most often ranging between —15° and 150° C. If necessary or desirable the reaction can be carried out in a pressure vessel. The reaction is preferably but not necessarily carried out in the presence of an acid acceptor such as an alkaline earth or alkali metal carbonate or bicarbonate or a tertiary amine such as pyridine, triethylamine, N,N-dimethylaniline or the like. The amount of acid acceptor can be varied widely; however, a 10 mole percent excess of that amount of base sufficient to bind the liberated strong acid (HQ) is routinely employed.

The condensation is usually conducted in the presence of an appropriate inert organic solvent. Typical solvents suitable for this purpose are dichloromethane, chloroform, carbon tetrachloride, benzene, toluene, bis(2-methoxyethyl)ether, acetonitrile, nitromethane and the like.

After reaction is complete, the product mixture is washed with aqueous hydrochloric acid, the solvent is evaporated in vacuo and the residue is dissolved in a dilute aqueous base solution which is washed with dichloromethane and treated with decolorizing charcoal. The product, in the form of a salt which is usually soluble in the basic aqueous layer is precipitated therefrom by addition of a mineral acid such as hydrochloric or sulfuric acid, and collected by filtration or extraction with dichloromethane.

Alternatively, a mercapto or hydroxy substituted haloalkane sulfonanilide can be coupled with a reactive thiazole derivative such as the 2-halo derivative (particularly the 2-bromo derivative) as shown in the following equation:

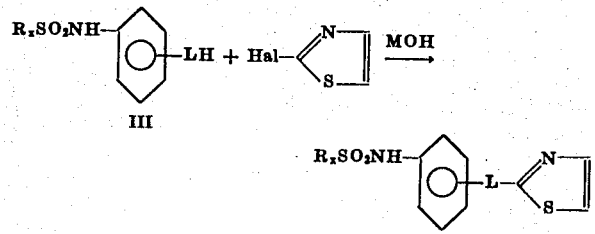

wherein $R_x$ is a previously defined, L is sulfur or oxygen, Hal is halogen and M is sodium or potassium. While this reaction proceeds readily when L is sulfur it is usually necessary to use stronger conditions and copper catalysis when L is oxygen. Solvents acceptable for this reaction when L is sulfur include alcohols and dimethylformamide. Pyridine is preferred when L is oxygen. The starting compounds of the Formula III are prepared by direct sulfonylation of the corresponding aniline or by sulfonylation of a protected form such as a disulfide or methyl ether, followed by cleavage to the —SH or —OH form respectively.

The salts of the invention are readily prepared by adding the stoichiometric amount of the selected base in inert solvent solution (aqueous or nonaqueous) to the acidic compound. The resulting solution is treated to remove the solvent, e.g. by evaporation under reduced pressure, to obtain the salt, usually as a dry powder. Appropriate bases for use in preparing the metal salts include metal oxides, carbonates, hydroxides, bicarbonates and alkoxides. The organic amine salts and the ammonium salts can be prepared by reacting the acid form with the appropriate organic base or ammonium hydroxide. Some salts are also prepared by cation exchange reactions (by reacting a salt of the invention with an organic or inorganic salt in a cation exchange reaction).

In order to prepare the compounds of the invention wherein R is lower alkyl, one reacts compounds of Formula I wherein R is a metal ion, for example sodium or potassium, with a stoichiometric amount of an alkyl bromide or iodine or a dialkylsulfate in a suitable nonreactive solvent, such as acetone.

Compounds of the invention wherein R is

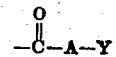

are prepared by reacting the corresponding compounds of Formula I wherein R is hydrogen or a cation with an acylating agent, of the formula

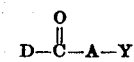

wherein A and Y are as previously defined and D is halogen, preferably fluorine, chlorine or bromine, or the residue of an anhydride, i.e. an acyloxy group. A wide variety of acylating agents of the foregoing formula can be used in preparing the compounds of the invention, including acyl halides or anhydrides, haloformates and the like. These compounds are either available directly or in the case of certain chloroformates are easily prepared from phosgene and the appropriate alcohol. Included among these compounds are for example acetyl chloride, n-butyl chloride, acetic anhydride, ethyl chloroformate and the like. When the precursor compound of Formula I is in the acid form (R is hydrogen) the reaction is generally run in the presence of a base, for example sodium carbonate, in order to form the salt in the reaction mixture.

Intermediate amines of Formula II are prepared from corresponding substituted nitro compounds of Formula V by reduction. Methods for the reduction of aromatic nitro compounds are well known to the art. Both chemical (for example iron and acetic acid, sodium sulfide in ethanol, and the like) and catalytic (for example Raney nickel, palladium on charcoal, and the like) methods are used successfully to convert the compounds of Formula V to compounds of Formula II.

Many of the nitro compounds of Formula V wherein L is carbonyl and the corresponding amines of formula II are known. Those which are not specifically known are prepared by methods known in the literature for analogous compounds. Thus, the novel 3-nitrophenyl-2-thiazolyl ketone is prepared by nitration of phenyl-2-thiazolyl ketone.

Anilines of Formula II wherein L is oxygen or sulfur are novel. They are prepared by reduction of the corresponding nitro compounds (which are also new) using chemical or catalytic methods as previously mentioned. Anilines of Formula II in which L is sulfur can also be prepared by condensing a mercaptosubstituted aniline with a reactive thiazole derivative (such as a 2-halo, particularly a 2-bromo, derivative) in the presence of sodium hydroxide or potassium hydroxide.

The nitro compounds are prepared by coupling reactions between known reactants as shown in the following equation:

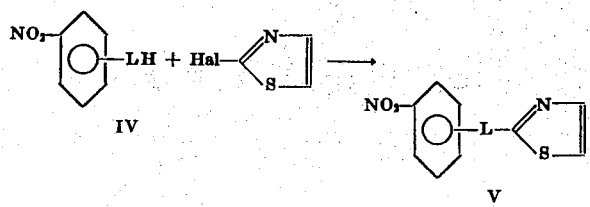

wherein L is oxygen or sulfur and Hal is chlorine, bromine or iodine, preferably bromine. The reaction may be run in the presence of a base which acts as an accelerator and acid acceptor, but is preferably carried out by prereacting the compound of Formula IV with base to form a salt, salts of inorganic basis being preferred. Such salts are readily prepared and may be prepared in situ or isolated. Most preferred are salts of alkali metals such as sodium and potassium, or cuprous salts. When L is oxygen, copper salts are not isolated. When alkali metal salts are used, dimethylformamide and pyridine are preferred solvents. When the salts are prepared in situ, using an alkali metal hydroxide as the base, and L is oxygen, it is preferred to use a trace of cuprous ion as catalyst. Pyridine is a preferred solvent when one or more of the reactants is of low reactivity.

Compounds of Formula II wherein L is sulfonyl and sulfinyl are prepared by oxidation of the corresponding compounds of Formula V wherein L is sulfur using standard oxidation reagents such as peracetic acid followed by reduction of the intermediate compounds of Formula V in which L is sulfonyl and sulfinyl, using chemical or catalytic reduction. Reney nickel is the preferred catalyst.

The compounds of Formulas II and V in which L is oxygen, sulfur, sulfonyl or sulfinyl, being novel intermediates in the preparation of certain of the compounds of Formula I, form a separate aspect of the present invention.

Compounds of Formula I wherein L is sulfonyl and sulfinyl and R is hydrogen may also be prepared by oxidation of the corresponding compounds of Formula I wherein L is sulfur using standard oxidation reagents such as peracetic acid.

As noted previously, the compounds of the invention are as a class active anti-inflammatory agents, although some are more active than others. The anti-inflammatory activity can be conveniently demonstrated using assays designed to test the ability of these compounds to antagonize local edema, which is a characteristic of the anti-inflammatory response (rat foot edema test), and to inhibit the onset of the erythematous manifestation of inflammation (guinea pig erythema test).

These are standard assays well know to those skilled in the art. They are described in journals and other publications. Leading references to the rat foot edema test are:

1. Adamkiewica et al., Canad. J. Biochem. Physic. 33:332, 1955;
2. Selye, Brit. Med. J. 2:1129, 1949; and
3. Winter, Proc. Soc. Exper. Biol. Med. 111:544, 1962

Leading references to the guinea pig erythema test are:
1. Wilhelmi, Schweiz. Med. Wschr. 79:577, 1949, and
2. Winder et al., Arch Int. Pharmacodyn. 116:261, 1958.

The anti-inflammatory activity of various compounds of the invention may be detected by other standard assays known to the art such as the cotton pellet granuloma and adjuvant arthritis test.

The compounds are administered orally, for example as four per cent acacia suspensions, but may also be administered parenterally. Amounts are generally about 1 to 500mg./kg. of body weight of the mammal to be treated.

In the rat foot edema test and/or the guinea pig erythema test the following compounds have been found to be particularly effective anti-inflammatory agents at dosage levels of less than 100mg./kg. in single doses:

3-(2-thiazolylthio)trifluoromethanesulfonanilide
3-(2-thiazolyloxy)trifluoromethanesulfonanilide
3-(2-thiazolylcarbonyl)trifluoromethanesulfonanilide
2-(2-thiazolylthio)trifluoromethanesulfonanilide
3-(2-thiazolylthio)difluoromethanesulfonanilide
3-(2-thiazolylthio)perfluoroethanesulfonanilide
3-(2-thiazolylthio)chloromethanesulfonanilide
N-carbethoxy-3-(2-thiazolylthio)trifluoromethanesulfo nanilide The following examples are given for the purpose of further illustrating the procedures of the present invention, but are not intended, in any way, to be limiting on the scope thereof. Thus, while the majority of the examples relate to compounds in which $R_x$ contains but a single carbon atom, other haloalkyl groups can be substituted in place thereof. Also although the examples relate for the most part to compounds in the acid form (that is having a hydrogen atom bonded to the sulfonamido nitrogen) together with compounds of the N-acyl type, it is understood that the salts and compounds of the invention in which R is an alkyl group are likewise contemplated. The salts, which have a cation bonded to the sulfonamido nitrogen, generally have the utility areas of the corresponding acid form compounds.

All melting points in the examples are uncorrected. The boiling points and melting points are given in degrees centigrade and the pressures in millimeters of mercury.

Examples 1–3 illustrate the preparation of the intermediates of Formulas II and V.

EXAMPLE 1

Potassium hydroxide solution (0.276 mole), 3-nitrophenol (38.4 g., 0.0276 mole), pyridine (50 ml.) and benzene (60 ml.) are heated under a nitrogen atmosphere at 130° C., removing the water by azeotropic distillation. After all water has been removed the remainder of the benzene is distilled off. A mixture of pyridine (75 ml.), 2-bromothiazole (45.3 g., 0.276 mole) and cuprous chloride (2g.) is added and the mixture is heated at reflux temperature for 32 hours. The mixture is steam distilled for 1 hour then cooled to room temperature. Water and chloroform are added to the mixture, then it is filtered. The mixture is then extracted with chloroform, and the organic layer dried over magnesium sulfate. The chloroform is removed in vacuo to give a dark oil which is vacuum distilled. The fraction boiling at 134°–150° C./0.4 mm. is washed twice with 5 percent sodium hydroxide, then extracted with benzene. The benzene solution is dried over magnesium sulfate, then the benzene is removed in vacuo. Fractional distillation gives 3-(2-thiazolyloxy)-nitrobenzene, b.p. 150°–152° C./0.3 mm.

| Analysis | %C | %H | %N |
|---|---|---|---|
| Calculated for $C_9H_6N_2O_3S$: | 48.7 | 2.7 | 12.6 |
| Found: | 48.4 | 2.7 | 12.6 |

EXAMPLE 2

3-(2-thiazolyloxy)nitrobenzene (16.7 g., 0.075 mole) is dissolved in ethanol, Raney nickel is added and the mixture is shaken under a pressure of about 46 p.s.i. of hydrogen gas. After about two hours hydrogen uptake stops. The mixture is treated with decolorizing charcoal and then filtered. The ethanol is removed in vacuo. The infrared spectrum of the product is consistent with the structure of 3-(2-thiazolyloxy)-aniline.

Compounds of Formula II wherein L is —S— instead of —O— are prepared in a similar manner using the respective intermediates of Formula IV in which L is —S—. The compounds of Formula II in which L is sulfinyl or sulfonyl are prepared by oxidation of the corresponding compounds in which L is —S—.

Compounds of Formula I in which L is sulfinyl or sulfonyl are also prepared by oxidation of the corresponding compounds in which L is —S—.

EXAMPLE 3

2-Benzoylthiazole (3.8 g., 0.02 mole) is dissolved in sulfuric acid (15 ml.) and the solution is cooled to about 0° C. A mixture of 97 percent sulfuric acid (1.6 ml.) and 90 percent nitric acid (2.5 ml.) is added dropwise over a period of 10 minutes while the temperature rises to 25° to 30° C. The solution is stirred at room temperature for 1 hour, then at about 35° C. for 3 hours. The mixture is poured over ice and neutralized with ammonium hydroxide. The yellow solid precipitate is separated by filtration. Recrystallization from methanol gives 2-(3-nitrobenzoyl)thiazole (i.e. 3-(2-thiazolecarbonyl)nitrobenzene), m.p. 110°–112° C.

| Analysis | %C | %H | %N |
|---|---|---|---|
| Calculated for $C_{10}H_3N_2O_3S$: | 51.2 | 2.5 | 12.0 |
| Found: | 51.4 | 2.6 | 12.0 |

The corresponding 3-(2-thiazolecarbonyl)aniline is prepared by reduction of this compound by the analogous process to that of Example 2.

The following examples illustrate the preparation of the compounds of the invention.

EXAMPLE 4

Trifluoromethanesulfonic anhydride (7.3 g., 0.026 mole) is added dropwise to a cooled solution of 3-(2-thiazolecarbonyl)aniline (5.3 g., 0.026 mole) and dimethylaniline (3.4 g., 0.026 mole) in dichloromethane (75 ml.) while maintaining the temperature at less than 5° C. The mixture is stirred overnight at room temperature. The reaction mixture is evaporated in vacuo then the resulting oil is slurried with 5 percent sodium hydroxide solution. The basic solution is washed with dichloromethane, then hexane, and neutralized with concentrated acetic acid. The product precipitates on cooling and is collected by filtration, then recrystallized from an ethanol-water mixture to give beige crystals of 3-(2-thiazolecarbonyl)trifluoromethanesulfonanilide, m.p. 145°–148° C.

| Analysis | %C | %H | %N |
|---|---|---|---|
| Calculated for $C_{11}H_7F_3N_2O_3S_2$: | 39.3 | 2.1 | 8.3 |
| Found | 39.4 | 2.2 | 8.3 |

The following compounds are prepared according to the method of Example 4:
2-(2-thiazolecarbonyl)trifluoromethanesulfonanilide
4-(2-thiazolecarbonyl)trifluoromethanesulfonanilide

EXAMPLE 5

3-(2-Thiazolylthio)nitrobenzene (b.p. 167°–169° C./0.05 mm) prepared as described above is reduced to form the corresponding 3-(2-thiazolylthio)aniline, m.p. 102°–4° C.

To a solution containing 3-(2-thiazolylthio)aniline (15 g., 0.092 mole), triethylamine (9.4 g., 0.093 mole) and chloroform (300 ml.) is added trifluoromethanesulfonic anhydride (15 ml., 0.09 mole) and the reaction mixture is stirred for two hours. The reaction mixture is evaporated in vacuo to remove volatiles such as solvent, treated with ten percent sodium hydroxide solution until basic, then the solution is steam distilled. The basic solution is next washed thoroughly with chloroform, treated with decolorizing charcoal and finally acidified. The product is then extracted with chloroform, the extracts are dried over magnesium sulfate and the solvent is removed in vacuo. The product is recrystallized from a benzene-hexane mixture, then twice from benzene to give 3-(2-thiazolylthio)trifluoromethanesulfonanilide, m.p. 120°–121.5° C.

| Analysis | %C | %H | %N |
|---|---|---|---|
| Calculated for $C_{10}H_7F_3N_2O_2S_3$: | 35.3 | 2.1 | 8.2 |
| Found | 35.4 | 2.2 | 8.2 |

The following compounds are prepared using the general method as exemplified in Example 5:

TABLE I

| Example Number | Compound | Melting Point (in °C.) |
|---|---|---|
| 6 | 3-(2-thiazolyloxy)trifluoromethanesulfonanilide | 123.0–125.0 |
| 7 | 2-(2-thiazolylthio)trifluoromethanesulfonanilide (1) | 108.0–109.5 |
| 8 | 3-(2-thiazolylthio)difluoromethanesulfonanilide | 109.5–112.0 |
| 9 | 3-(2thiazolylthio)chloromethanesulfonanilide | 99.0–101.5 |
| 10 | 4-(2-thiazolylthio)trifluoromethanesulfonanilide (1) | 138.5–140.5 |

(1) Intermediate anilines of Examples 7 and 10 (Formula II) are prepared by coupling the mercaptoaniline with 2-bromothiazole. The aniline intermediates (Formula II) of these Examples melt at 59–60° C. and 74–76° C. respectively.

EXAMPLE 11

3-(2-thiazolylthio)trifluoromethanesulfonanilide (8.5 g., 0.025 mole) is dissolved in glacial acetic acid (100 ml.) ad 30 percent hydrogen peroxide (0.05 mole) is added with caution. The mixture is heated on a steam bath for five hours, then cooled. Cold water is added with stirring and the white precipitate is separated by filtration and washed thoroughly with water. The 3-(2-thiazolylsulfonyl)trifluoromethanesulfonanilide melts at 155°–156° C.

| Analysis | %C | %H | %N |
|---|---|---|---|
| Calculated for $C_{10}H_7F_3N_2O_4S_3$: | 32.3 | 1.9 | 7.5 |
| Found: | 32.5 | 2.0 | 7.4 |

EXAMPLE 12

3-(2-thiazolylthio)aniline is reacted overnight in a pressure reactor with perfluoroethanesulfonyl fluoride in the presence of excess triethylamine at about 75° C. The reaction mixture is basified with sodium hydroxide, steam distilled to remove triethylamine, filtered and the filtrate acidified to precipitate the product, 3-(2-thiazolylthio)-perfluoroethanesulfonanilide, m.p. 108°–109° C.

EXAMPLE 13

4-Hydroxytrifluoromethanesulfonanilide (8.2 g., 0.034 mole), benzene (20 ml.) and pyridine (30 ml.) are stirred at 100° C. while adding aqueous potassium hydroxide (8.5 g., 0.065 mole). Water is removed using a Dean-Stark trap then additional pyridine (30 ml.) is added. 2-Bromothiazole (5.6 g., 0.034 mole) cuprous chloride (0.5 g.) and dimethylacetamide (10 ml.) are added and the mixture is heated at reflux temperature overnight. The reaction mixture is mixed with water, treated with decolorizing charcoal, filtered and the filtrate washed with dechloromethane. The filtrate is then acidified and the solid extracted into dichloromethane. This solution is dried over magnesium sulfate, filtered, then evaporated to give a dark liquid. The liquid is chromatographed on acid alumina in dichloromethane. The first fraction, eluting with trichloroethylene, is recrystallized from cyclohexane and a small amount of trichloroethylene with treatment with decolorizing charcoal. A white solid, m.p. 123.5°–126° C, 4-(2-thiazolyloxy)trifluoromethanesulfonanilide, is obtained.

| Analysis | %C | %H | %N |
|---|---|---|---|
| $C_{10}H_7F_3N_2O_3S_2$: | 37.0 | 2.2 | 8.6 |
| Found: | 37.2 | 2.5 | 8.7 |

EXAMPLE 14

3-(2-Thiazolylthio)trifluoromethanesulfonanilide is dissolved in acetone, stirred with excess sodium carbonate and treated with excess ethyl chloroformate, then refluxed several hours. After cooling and filtration the solvent is evaporated in vacuo. The product is purified and crystallized after column chromatography on neutral alumina to give N-ethoxycarbonyl-3-(2-thiazolylthio)trifluoromethanesulfonanilide, m.p. 48° C.

| Analysis | %C | %H | %N |
|---|---|---|---|
| $C_{13}H_{11}F_3N_2O_4S_3$: | 37.9 | 2.7 | 6.8 |
| Found | 37.5 | 2.8 | 6.7 |

Other exemplary compounds of the invention are given in Table II.

TABLE II

| Example Number | Compound |
|---|---|
| 15 | 3-(2-thiazolylthio)fluorochloromethanesulfonanilide |
| 16 | 3-(2-thiazolylthio)perfluoro-n-butanesulfonanilide |
| 17 | N-acetyl-3-(2-thiazolyloxy)trifluoromethanesulfonanilide |

| 18 | N-n-butyryl-3-(2thiazolylthio)trifluoromethanesulfonanilide |
| --- | --- |
| 19 | N-isobutoxycarbonyl-3-(2-thiazolylthio)trifluoromethanesulfonanilide methanesulfonanilide |
| 20 | N-ethoxycarbonyl-3-(2thiazolecarbonyl)trifluoromethanesulfonanilide methanesulfonanilide |
| 21 | 3-(2-thiazolylsulfinyl)trifluoromethanesulfonanilide |
| 22 | 4-(2-thiazolylsulfinyl)trifluoromethanesulfonanilide |
| 23 | 2-(2-thiazolylsulfinyl)trifluoromethanesulfonanilide |
| 24 | 3-(2-thiazolylsulfonyl)perfluoroethanesulfonanilide |
| 25 | 3-(2-thiazolylsulfinyl)perfluoroethanesulfonanilide |
| 26 | 3-(2-thiazolylsulfinyl)difluoromethanesulfonanilide |
| 27 | 3-(2-thiazolylsulfonyl)difluoromethanesulfonanilide |
| 28 | 3-(2-thiazolylsulfonyl)chloromethanesulfonanilide |
| 29 | sodium-3-(2-thiazolylthio)trifluoromethanesulfonanilide |
| 30 | Potassium-3-(2-thiazolylthio)trifluoromethanesulfonanilide |
| 31 | triethylammonium-3-(2-thiazolylthio)trifluoromethanesulfonanilide |
| 32 | magnesium-3-(2-thiazolyloxy)trifluoromethanesulfonanilide |
| 33 | ammonium-3-(2-thiazolylcarbonyl)trifluoromethanesulfonanilide |

EXAMPLE 34

3-(2-Thiazolylthio)trifluoromethanesulfonanilide (4.0 g., 0.026 mole) is dissolved in acetone (125 ml.) and stirred with sodium carbonate (5.6 g., 0.053 mole) for 1 hour in order to form sodium 3-2(thiazolylthio)trifluoromethanesulfonanilide. Methyl iodide (3.7 g., 0.026 mole) is added to the solution and the mixture is stirred overnight at room temperature in a closed flask. The mixture is then filtered, and the filtrate is evaporated in vacuo. The residue is washed with water, then extracted thoroughly with benzene. The benzene extracts are dried, then evaporated in vacuo to give an oil. Careful fractional distillation gives a clear liquid, N-methyl-3-(2-thiazolylthio)trifluoromethanesulfonanilide, b.p. 170°–172° C./0.7 mm. Hg.

| Analysis | | %C | %H | %N |
| --- | --- | --- | --- | --- |
| Calculated for $C_{11}H_9F_3N_2O_2S_3$: | | 37.3 | 2.6 | 7.9 |
| | Found: | 37.3 | 2.4 | 8.1 |

What is claimed is:

1. A compound of the formula

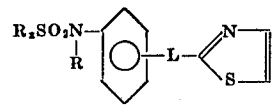

wherein $R_x$ is haloalkyl of one to four carbon atoms in which at least 1 halogen is bonded to the alpha carbon atom or at least 2 halogens are bonded to the beta carbon atom, R is hydrogen, lower alkyl, a pharmaceutically acceptable cation or

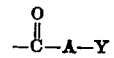

wherein A is oxygen or a carbon-carbon bond and Y is lower alkyl and L is oxygen, sulfur, carbonyl, sulfinyl or sulfonyl.

2. A compound according to claim 1 wherein the halogen atoms in $R_x$ are selected from fluorine and chlorine.
3. A compound according to claim 2 wherein $R_x$ contains not more than two carbon atoms.
4. A compound according to claim 2 wherein $R_x$ is trifluoromethyl.
5. A compound according to claim 2 wherein $R_x$ is difluoromethyl.
6. A compound according to claim 1 wherein R is hydrogen.
7. A compound according to claim 1 wherein R is an alkali metal cation.
8. A compound according to claim 1 wherein L is oxygen.
9. A compound according to claim 1 wherein L is carbonyl.
10. A compound according to claim 1 wherein L is sulfur.
11. 3-(2-thiazolylthio)trifluoromethanesulfonanilide according to claim 1.
12. 3-(2-thiazolyloxy)trifluoromethanesulfonanilide according to claim 1.
13. 3-(2-thiazolylcarbonyl)trifluoromethanesulfonanilide according to claim 1.
14. 2-(2-thiazolylthio)trifluoromethanesulfonanilide according to claim 1.
15. 3-(2-thiazolylthio)difluoromethanesulfonanilide according to claim 1.
16. 3-(2-thiazolylthio)perfluoroethanesulfonanilide according to claim 1.
17. 3-(2-thiazolylthio)chloromethanesulfonanilide according to claim 1.
18. N-carbethoxy-3-(2-thiazolylthio)trifluoromethanesulfonanilide according to claim 1.

* * * * *